(12) United States Patent
Rizk et al.

(10) Patent No.: US 7,468,879 B2
(45) Date of Patent: Dec. 23, 2008

(54) LIGHTNING PROTECTION DEVICE WET/DRY GLOW-BASED STREAMER INHIBITOR

(76) Inventors: Farouk A. M. Rizk, 98 De la Moselle, Saint-Lambert, Quebec (CA) J4S 1W2; Amr Rizk, 98 De la Moselle, Saint-Lambert, Quebec (CA) J4S 1W2

( * ) Notice: Subject to any disclaimer, the term of this patent is extended or adjusted under 35 U.S.C. 154(b) by 335 days.

(21) Appl. No.: 11/484,782

(22) Filed: Jul. 12, 2006

(65) Prior Publication Data

US 2007/0115607 A1    May 24, 2007

(51) Int. Cl.
  *H01H 47/00* (2006.01)
  *H05F 3/00* (2006.01)
  *H05F 3/02* (2006.01)
  *H02H 1/00* (2006.01)
  *H02H 1/04* (2006.01)
  *H02H 3/22* (2006.01)
  *H02H 9/06* (2006.01)
  *H02H 3/00* (2006.01)

(52) U.S. Cl. .................. 361/220; 361/117; 361/212

(58) Field of Classification Search .............. 361/220, 361/117, 212
See application file for complete search history.

(56) References Cited

U.S. PATENT DOCUMENTS

| | | |
|---|---|---|
| 3,609,218 A | 9/1971 | Raymond et al. |
| 3,825,671 A | 7/1974 | Pokorny |
| 3,930,113 A | 12/1975 | Johansen et al. |
| 4,180,698 A | 12/1979 | Carpenter, Jr. |
| 4,458,107 A | 7/1984 | Héroux |
| 4,605,814 A | 8/1986 | Gillem |
| 4,679,114 A * | 7/1987 | Carpenter, Jr. ............ 361/117 |

(Continued)

FOREIGN PATENT DOCUMENTS

CA    1205514    6/1986

(Continued)

OTHER PUBLICATIONS

Farouk A.M. Rizk, Modeling of Lightning Incidence to Tall Structure Part I: IEEE Trans. on Power Delivery, Canada, Jan. 1994, vol. 9, No. 1, pp. 162-171.

(Continued)

*Primary Examiner*—Stephen W Jackson
*Assistant Examiner*—Dharti H Patel
(74) *Attorney, Agent, or Firm*—Goudreau Gage Dubuc; Gonzalo Lavin

(57) ABSTRACT

A lightning protection device for reducing exposure of an object to be protected from conventional and upward lightning strikes. The device includes a support structure adapted to be grounded and space charge producing conductors wound around the support structure and forming coils for producing space charge of opposite polarity to a cloud charge, in a proximity of the object to be protected. The space charge induces a charge on the object to be protected of an opposite polarity to a charge induced on the object to be protected by the cloud charge and inhibits a formation of streamers from the object to be protected. Each space charge producing conductor has a diameter not exceeding 0.1 mm for reducing a corona inception voltage of the support structure upon which each space charge producing conductor is wound, in both dry and wet conditions.

20 Claims, 17 Drawing Sheets

U.S. PATENT DOCUMENTS

| | | | |
|---|---|---|---|
| 4,910,636 | A * | 3/1990 | Sadler et al. ............ 361/221 |
| 5,043,527 | A | 8/1991 | Carpenter, Jr. |
| 5,073,678 | A | 12/1991 | Carpenter, Jr. |
| 5,932,838 | A | 8/1999 | Carpenter, Jr. |
| 6,017,628 | A | 1/2000 | Stevens et al. |
| 6,069,314 | A * | 5/2000 | Varela ............ 174/3 |
| 6,307,149 | B1 | 10/2001 | Zini et al. |
| 6,320,119 | B1 | 11/2001 | Gumley |
| 7,236,341 | B1 | 6/2007 | Carpenter |
| 2003/0067731 | A1 | 4/2003 | Kent |
| 2003/0103311 | A1 | 6/2003 | Zhuang |
| 2004/0130842 | A1 | 7/2004 | Johansen |
| 2005/0146832 | A1 | 7/2005 | D'Alessandro |

FOREIGN PATENT DOCUMENTS

| | | |
|---|---|---|
| CA | 2543551 | 6/2005 |
| EP | 0488695 | 6/1992 |

OTHER PUBLICATIONS

Farouk A.M. Rizk, Modeling of Lightning Incidence to Tall Structure Part II: IEEE Trans. on Power Delivery, Canada, Jan. 1994, vol. 9, No. 1, pp. 172-193.

Farouk A.M. Rizk, A Model for Switching Impulse Leader Inception and Breakdown of Long Air-Gaps: IEEE Trans. on Power Delivery, Canada, Jan. 1989, vol. 4, No. 1, pp. 596-606.

Farouk A.M. Rizk, Switching Impulse Strength of Air Insulation: Leader Inception Criterion: IEEE Trans. on Power Delivery, Canada, Oct. 1989, vol. 4, No. 4, pp. 2187-2195.

Farouk A.M. Rizk, Influence of Rain on Switching Impulse Sparkover Voltage of Large Electrode Air-Gaps: IEEE Trans. on Power Apparatus and Systems, Canada, Jul./Aug. 1976, Vol. PAS-95, No. 4, pp. 1394-1402.

Farouk A.M. Rizk, Modeling of Transmission Line Exposure to Direct Strokes: IEEE Trans. on Power Delivery, Canada, Oct. 1990, vol. 5, pp. 1983-1997.

C.A.E. Uhlig, "The Ultra Corona Discharge, A New Discharge Phenomenon Occurring on Thin Wires", Proceedings of High Voltage Symposium, National Research Council of Canada, Ottawa, 1956, paper No. 15.

C.A.E. Uhlig, "A.C. Corona Current and Loss on Thin Wires from Onset to Sparkover", Proceedings of High Voltage Symposium, National Research Council of Canada, Ottawa, 1956, paper No. 16.

V.I. Popkov, "Some Special Features of Corona on High-Voltage DC Transmission Lines", in Gas Discharges and the Electric Supply Industry, Proceedings of International Conference, CERL, Leatherhead, Surrey, England, May 1962, pp. 225-237.

N.G. Trinh, J.B. Jordon, "Modes of Corona Discharge in Air", IEEE Trans. May 1968, vol. PAS-87, No. 5, pp. 1207-1215.

P. Heroux, P.S. Maruvada, N.G. Trinh, "High Voltage AC Transmission Lines: Reduction of Corona Under Foul Weather" IEEE Trans., Canada, Sep. 1982, vol. PAS-101, No. 9, pp. 3009-3017.

* cited by examiner

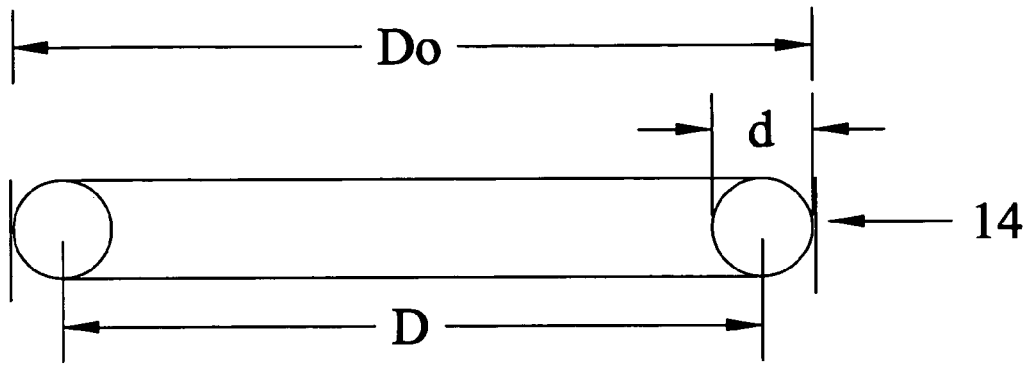
Fig. 2.a
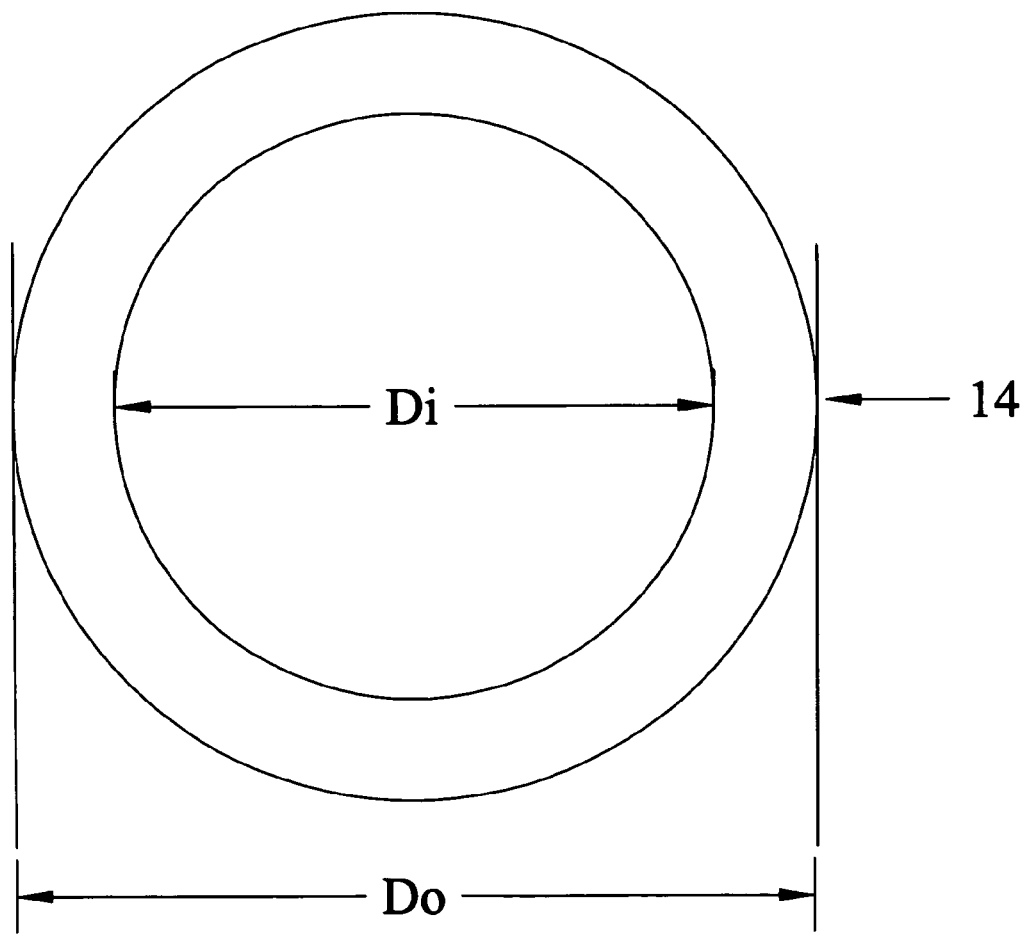
Fig. 2.b

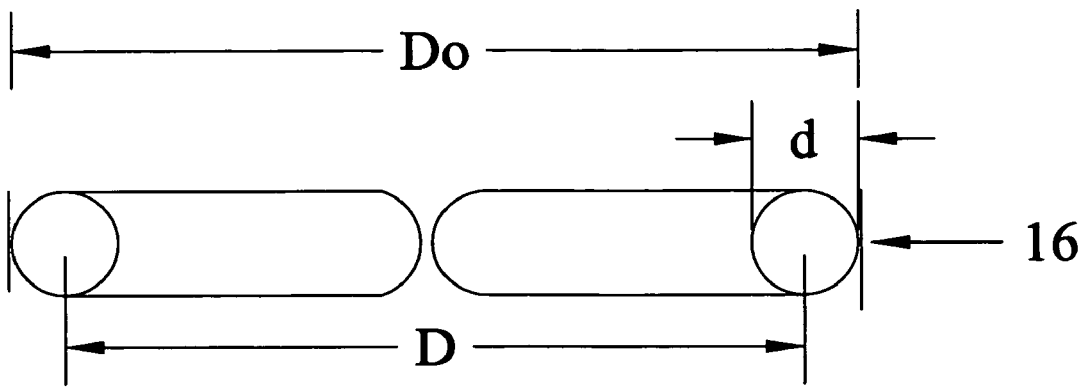
Fig. 3.a
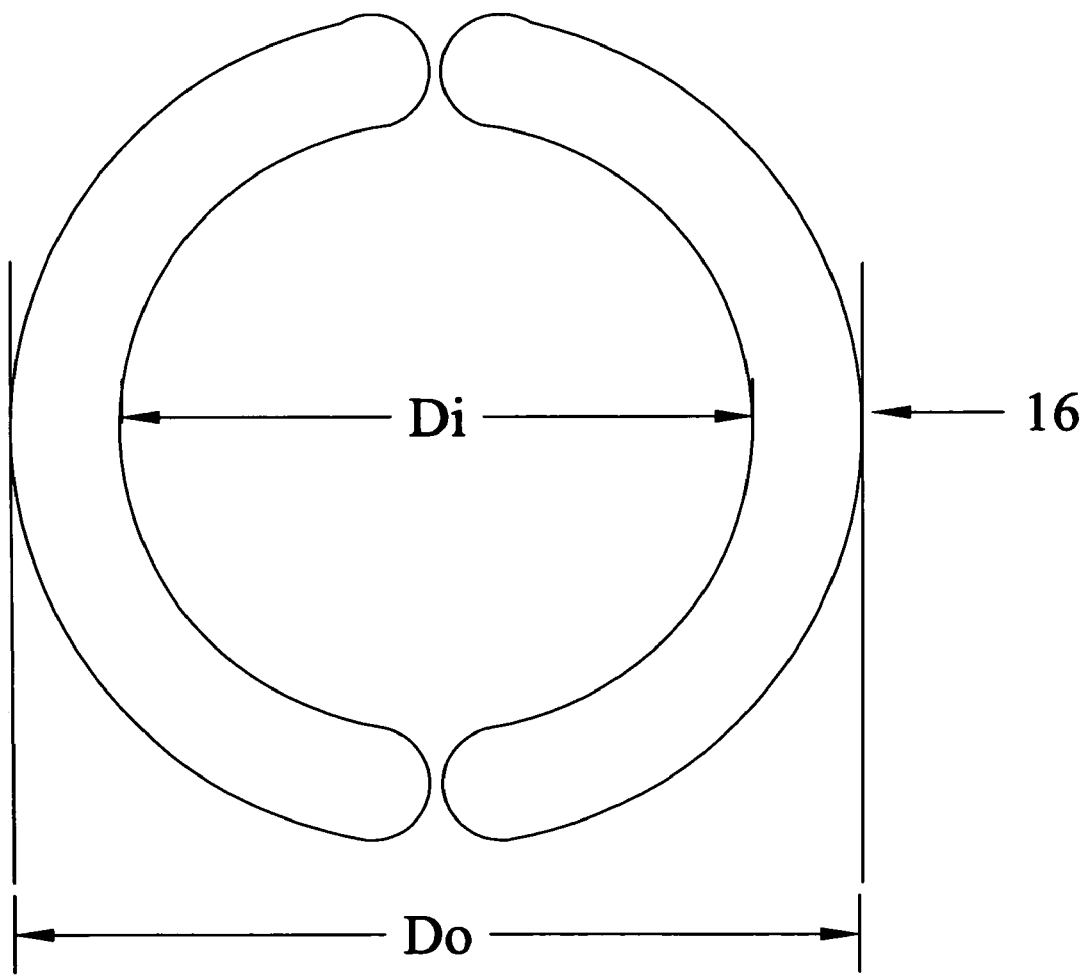
Fig. 3.b

LIGHTNING PROTECTION DEVICE WET/DRY GLOW-BASED STREAMER INHIBITOR

FIELD OF THE INVENTION

The present invention relates to a lightning protection device.

BACKGROUND OF THE INVENTION

It is well known that most lightning discharges are associated with predominantly negatively charged clouds. Two main categories of lightning strikes are encountered: Upward flashes from very tall structures and the more prevalent strikes associated with negative descending stepped leaders (ref. [1], [2]). The negative descending leader is surrounded with a negative space charge sheath which, as the negative leader approaches the ground, induces positive (image) charges on any grounded object in its sphere of influence. The higher the grounded structure and the nearer it is to the path of the descending negative leader, the more significant the induced charge on the grounded structure.

It is known that a lightning stroke current is a statistical variable that varies in a wide range from a few kA to a few hundred kA with a median of 25-35 kA. The attractive radius of a structure i.e. the maximum radial distance around the structure in which a descending leader would be captured by the structure increases with both the stroke current, which is associated with the negative space charge jacket and the structure height.

In recent years, based on progress in research on the physics of breakdown of long air gaps, our understanding of the mechanisms by which different ground structures are hit by lightning have been substantially improved. In particular the role played by the grounded object in the strike mechanism has been clarified. Modeling (ref. [6]) has shown that the attractive radius comprises two parts: a major part (two thirds or more) spanned by the positive leader emanating from the structure and the lesser part constituting the final jump between the negative and positive leader tips.

Electrostatic field analysis shows that the electric field enhancement at the surface of and in the vicinity of any grounded structure is predominately caused by the positive (image) charge that has been induced onto the grounded structure by the cloud charge and/or the descending negative leader and that this far exceeds the background field due to the cloud charge and/or the descending leader itself. Depending on the structural characteristics of the grounded object an inception field caused by the induced charge is reached when ionization of the surrounding air takes place causing corona discharge and positive streamer formation. Depending on the geometry of the grounded structure and the amount of induced positive charge the length of the positive streamer can grow into the meter range.

If the positive streamer reaches a critical size (ref. [3], [4]) a highly conducting stem is formed at the streamer junction to the structure and a positive leader is thereby formed. Contrary to the positive streamer which has a mean gradient of approximately 400-500 kV/m, the leader gradient is a function of both the leader current and the time duration of its existence. For a current of 1 A the leader gradient could be 30-50 kV/m i.e. approximately one tenth of the positive streamer gradient but for a leader current of the order of 100 A the leader gradient could go down to as low as 2-3 kV/m. This shows that contrary to the positive streamer, a positive leader is capable of traveling distances in the 100 m range without requiring unrealistically high electric potential.

It is important to note that not every positive leader emanating from a grounded structure will complete the trajectory to encounter the descending negative leader in a final jump. As the positive leader travels farther and farther from the structure its motion will be governed more and more by such parameters as space potential and the electric field ahead of the leader tip, which are determined more and more by the descending leader charge and less and less by the grounded structure. When conditions are not appropriate for continued propagation, the positive leader stops and the concerned grounded structure which started the positive streamer/positive leader process is not struck.

Objects that are struck by downward negative lightning are those which, due to their induced positive charge, "succeed" in creating long positive streamers resulting in the formation of a positive leader which progresses in a zone of increasing electric field in order to meet the approaching descending negative lightning leader in what is termed the final jump. The final jump takes place when the mean voltage gradient between the tip of the ascending positive leader and the tip of the descending negative lightning leader reaches 500-600 kV/m.

As seen from the negative descending lightning leader, all grounded objects with their respective induced positive charges are in a competition which determines: which among them will produce significant positive streamer activity and which among them will "succeed" in producing a positive leader that will complete the trajectory to the final jump. If no elevated structure "succeeds" in completing the trajectory to the final jump, the negative descending leader will proceed to ground by default. Therefore if the intent is to reduce the risk of such a lightning strike it will be of great advantage for any structure to remain electrically silent, i.e. to be inactive or inhibited in the game of producing long positive streamers.

The second type of lightning flash referred to above is the upward flash which takes place in the form of an upward positive streamer/leader process without the presence of a negative descending leader. The probability of this type of lightning strokes becomes significant in structures with heights in excess of 100 m on flat ground. They can also take place on much shorter structures on mountain tops. Here the field enhancement at and in the proximity of the structure is caused by the induced positive charge on the structure directly caused by the negative charge of the cloud alone since no descending leader is present.

For upward lightning the ambient (ground) field needed for positive leader inception depends mostly on the structure height. For tall structures the critical ambient field is in fact related to the structure height by the simple relationship $E_g=1600/h$ where $E_g$ is given in kV/m and the structure height is given in meters (ref. [1], [2]). Even for the tallest structures the critical ambient field should exceed 3 kV/m (ref. [1], [2]). Therefore and once again if the intent is to reduce the risk of an upward lightning strike, it will be of great advantage for any structure to remain electrically silent, i.e. to be inactive or inhibited or to require higher fields than normal to participate in the game of producing long positive streamers.

BACKGROUND OF THE PRIOR ART

Lightning protection practices can be divided into two broad categories. The first being variations on the Franklin Rod or overhead ground wires whose purpose is to give a preferential path for the current of a lightning stroke and thus prevent potential damage. These systems do not claim to affect the probability of occurrence of a lightning strike.

The other broad category of lightning protection practices can be called "the dissipation systems", such as U.S. Pat. No. 5,043,527 (Carpenter), U.S. Pat. No. 4,910,636 (Sadler et al.), and U.S. Pat. No. 4,605,814 (Gillem). These systems use points or end-tips of wires or rods to produce space charge. There are several contradicting statements, with little or no scientific basis, on how these devices are supposed to work. Some dissipation system proponents claim that the production of space charge can neutralize the negative charge of the cloud and thereby eliminate lightning, which is an unrealistic task. Other dissipation systems proponents claim that the dissipation of ions from the protected structure will reduce the accumulated charge by blowing it downwind and reduce or minimize the potential difference between the charged cloud and the protected structure.

These claims are of course physically invalid since the induced (image) charges on a grounded structure are charges which remain in place so long as the inducing charges of the cloud or descending leader remain and cannot be dissipated into the surrounding air. Furthermore it is a well established scientific fact that metals do not emit positive ions. On the contrary positive space charge is formed by ionization processes that result in electrons being collected by the electrode (structure) and injected into the ground leaving the positive ion space charge behind in the surrounding air. Also changing the potential between the cloud and a grounded object necessarily means the unrealistic task of changing the potential of the cloud since by definition the grounded structure, unless struck by lightning, is and will always remain at ground potential.

STATEMENT OF THE OBJECT OF THE INVENTION

An object of the present invention is to control the inception of positive streamer/leader in a structure terminal under different atmospheric conditions.

The first possibility for controlling positive leader inception from a grounded structure terminal is to modify the terminal geometry. It must be noted however that if the equivalent radius of the structure terminal, defined as the space potential divided by the electric field at the terminal surface, is below a critical value, the so-called critical radius, the geometry of the structure has practically no effect on positive leader inception. If on the other hand the terminal geometry is modified by a conducting surface with a large radius of curvature, the leader inception space potential can indeed be increased but only under dry conditions. Under rain however the leader inception level from the large electrode will be the same as with a terminal where the equivalent radius is equal to or smaller than the critical radius (ref. [5]).

The second technique for controlling discharge activity from a structure terminal is by space charge shielding. For the device producing positive space charge to be successful in protecting a structure terminal, several prerequisites are in order:

1. The space charge producing device must not produce corona in the positive streamer mode. Such positive streamer production will defeat the purpose of positive space charge generation and may in fact enhance the probability of the device being struck by lightning as per the mechanism described above. This requirement alone could exclude many devices based upon the point discharge since points or point arrays are generally known to be prone to positive streamer production.

2. The device must be able to be streamer free, not only under dry conditions but also under wet conditions. This requirement is obvious since lightning is usually associated with rain. A device that functions as required only in dry conditions will not be adequate.

3. The device must be able to produce sufficiently high rates of space charge, streamer free, to achieve its intended goal even under windy conditions. Furthermore packing a large number of discharge points in close proximity will not solve this problem since close points will interact and limit their ability to produce space charge.

4. The device must afford some means of control of the production of space charge so as to be applicable in a variety of situations and conditions.

5. In order to inhibit the development of positive streamers from a grounded structure when desired, the device must produce a sufficiently high rate of space charge, streamer free, in the relatively short time available when the ambient field increases ahead of the lightning stroke and in the few tens of milliseconds as the negative leader moves towards the earth producing variations of the space potential in the range exceeding 1 kV/µs.

In view of the above, it is a further object of the present invention to provide a wet/dry glow-based streamer inhibitor that meets all the required criteria listed for the space charge shielding technique for controlling discharge activity from a grounded structure terminal.

SUMMARY OF THE INVENTION

According to the present invention, there is provided a lightning protection device for reducing exposure of an object to be protected from conventional and upward lightning strikes, the device comprising:

a support structure adapted to be grounded; and space charge producing conductors wound around the support structure and forming coils for producing space charge of opposite polarity to a cloud charge, in a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions.

Preferably, the space charge producing conductors are selected from the group including a conducting wire, a bundle of conducting wires, a conducting fiber, a conducting filament, a bundle of conducting filaments, a yarn made of conducting wires, a yarn made of a bundle of conducting wires, a yarn made of conducting fibers, a yarn made of conducting filaments, a yarn made of a bundle of conducting filaments, a knitted fabric made of conducting wires, a knitted fabric made of a bundle of conducting wires, a knitted fabric made of conducting fibers, a knitted fabric made of conducting filaments, a knitted fabric made of a bundle of conducting filaments, a woven fabric made of conducting wires, a woven fabric made of a bundle of conducting wires, a woven fabric made of conducting fibers, a woven fabric made of conducting filaments, a woven fabric made of a bundle of conducting filaments, and wherein each of said wires, fibers and filaments has a diameter not exceeding 0.1 mm.

Preferably, the support structure is grounded and is selected from the group including: a continuous toroid, a sectionalized toroid, a continuous metallic toroid, a sectionalized metallic toroid, a lightning pole, an overhead ground wire of transmission lines, an overhead ground wire of an electrical substation, guyed wires and a wind turbine blade.

Preferably, the space charge producing conductors are wound around the support structure to form a single layer of conductors or multiple layers of conductors.

Preferably, the space charge producing conductors are wound around the support structure in a longitudinal direction and/or a transverse direction.

In use, when the device is properly shaped and dimensioned and exposed to the electric fields that precede a lightning strike it goes into glow mode corona and produces a high and predictable rate of positive space charge in both wet and dry conditions. This rate of positive space charge production is sufficient, even in windy conditions, to induce a negative charge on structures or conductors within a defined area and inhibit the development of positive streamers thereby reducing the risk of both conventional and upward lightning strikes.

According to another aspect of the present invention, there is provided a method of making a lightning protection device for reducing exposure of an object to be protected from conventional and upward lightning strikes, the method comprising steps of:

a) providing a support structure adapted to be grounded; and b) winding space charge producing conductors around the support structure to form coils for producing space charge of opposite polarity to a cloud charge, in a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions.

Preferably, step b) comprises steps of selecting a given winding pitch of the coils formed by the space charge producing conductors and selecting a given length of the space charge producing conductors wound around the support structure to control a rate of the space charge that is produced in the proximity of the object to be protected.

Preferably, step a) comprises a step of selecting a given height above ground of the support structure to control a value of an electric field to which the space charge producing conductors are exposed for any given ambient field.

Preferably, step a) comprises steps of selecting a given length of the support structure and selecting a given length of the space charge producing conductors to control a value of the rate of the space charge that is produced in the proximity of the object to be protected for any given ambient field and a given height above ground of the support structure.

Preferably, step a) comprises steps of selecting a given diameter of the support structure and selecting a length of the space charge producing conductors to control a value of the rate of the space charge that is produced in the proximity of the object to be protected for any given ambient field and a given height above ground of the support structure.

Preferably, the support structure is a conducting support structure and step a) comprises a step of selecting a diameter of the conducting support structure to control an electric field to which the space charge producing conductors are exposed for any given ambient field and a given height above ground of the support structure.

Preferably, step a) comprises a step of positioning the support structure on top of or in close proximity to the object to be protected.

Preferably, step b) comprises a step of embedding the coils into the object to be protected. Preferably, the object itself acts as the support structure.

According to yet another aspect of the present invention, there is provided two or more lightning protection devices for reducing exposure of an object to be protected from conventional and upward lightning strikes, each device comprising:

a support structure adapted to be grounded; and space charge producing conductors wound around the support structure and forming coils for producing space charge of opposite polarity to a cloud charge, in a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions, wherein each lighting protection device is spaced from one another by a given distance.

Preferably, the invention disclosed here within is a lightning protection device that distinguishes itself from all previous systems in that:

It uses coils consisting of very thin (diameter not exceeding 0.1 mm) conducting wires or fibers, or fabrics made of such fibers or wires for the production of space charge.

It only produces corona in the pulse-less-glow modes (streamer free) even in exceptionally high fields.

It functions in both wet and dry conditions.

It provides means of control of the rate of space charge production.

Furthermore because of the short distance between the device (Inhibitor) and the protected structure, compared with the distance between the structure tip and the cloud or the descending leader, it accomplishes the realistic task of counteracting the effects of the cloud or descending negative leader on the protected structure by inducing a significant charge of appropriate polarity. And in this manner inhibit the development of streamers from the protected or adjacent conductors or structure.

Preferably, the device includes a support structure, which is at least partially metallic or conducting, such as a toroid of various shapes and sizes or an overhead ground wire, or guyed wire. The device may alternatively include a non-conducting support structure, such as a blade of a wind turbine. In both cases, the support electrode or support structure is wrapped in a very thin (diameter not exceeding 0.1 mm or 0.00394" although best results may be achieved with diameters in the range 10-50 microns) conducting wire, fiber, filament or bundles of filaments, yarn or woven or knitted fabric made from such thin fibers or wires in single or multiple layers, in the longitudinal and/or the transverse sense, to form a continuous or sectionalized electric coil. Preferably the conducting wires or fibers or filaments are made of a weather resistant material such as a stainless steel. The conducting wires or fibers are electrically connected to the ground and are so thin that when they get into corona they produce a glow-type discharge without forming streamers in dry as well as wet conditions. When properly shaped and dimensioned for the required heights above ground the device can produce space charge in ambient (ground) fields as low as 2 kV/m as well as high ambient fields in the range of hundreds of kV/m streamer free. An accumulated positive space charge in the ten milli-Coulomb range in the proximity of the Wet/ Dry Glow-Based Streamer Inhibitor can, with due consideration to its image charge, induce a negative charge sufficient to inhibit the development of positive streamers at distances around the device in the range of tens of meters.

A convenient quality of the toroidal electrode support structure is that it can be easily retrofitted to existing lightning/Franklin rods. Also, applying the invention to protect transmission lines and/or substations has the advantage that the inhibitor coil can be easily fitted to existing ground wires.

The use of a metallic toroid electrode as the supporting structure of the electric coil provides means for controlling and intensifying the electric field to which the coil is actually exposed for any prevailing value of the ambient field due to the cloud or the descending leader. This is done by adjustment of the toroid's minor and major diameters as well as its height above ground.

In addition to field control by the dimensions and height above ground of the electrode, the winding pitch of the coil will determine the length of the coil and therefore the rate of positive charge production around the device. This provides unique possibilities for charge control and determination of the sensitivity of the device (Inhibitor) to the ambient field due to the cloud or the negative descending leader.

The described invention provides additional simple means of increasing charge production, under otherwise the same conditions through the use of multiple properly spaced Inhibitor coils (multiple ground wires). For the case of the toroids, the spacing between individual toroids in a double-toroid-electrode arrangement should be significantly larger than the minor diameter and significantly smaller than the major diameter of the individual toroids. The necessity and spacing between subsequent double toroids in a multi-toroid arrangement will be determined by the height of the protected structure and the major diameter of the individual toroid.

It is well known that space charges move in an electric field and are carried away by wind and rain drops.

The positive space charge generated by the Inhibitor coil has two components. The first is produced as soon as the ambient electric field due to the cloud leads to corona inception on the space charge producing element of the Inhibitor coil. This is a relatively slow process but any charge removed by wind or rain immediately enhances the electric field perpendicular to the electrode's (toroid, ground wire or guyed wire) surface and increases the rate of charge production until a situation of equilibrium is reached between charge removal and charge production.

The second component of the space charge is produced due to the electric field intensification during the propagation of the negative leader down to ground. It is well known that the negative descending leader speed is of the order $10^5$ m/s. This means that the negative leader covers a distance of 1 km in approximately 10 ms. For a wind speed of a few tens of meters/s and a speed of falling rain drops of some meters/s, the space charge generated by the Inhibitor in a 10 ms duration will be practically stagnant and will play its assigned role.

Because of this unique property of producing high rates of positive space charge without streamers, in both dry and wet conditions, negative charges are induced on adjacent (protected) structures even under windy conditions. Such induced negative charges on a protected structure counteract the positive charge induced on the structure by the negative charge of the cloud or the descending negative leader. This has the effect of inhibiting positive streamer formation from the protected structure or in particular inhibiting the streamers from reaching the critical size needed for transformation into a leader discharge and therefore reduce the structure's participation in the lightning attachment process and thus reduce its vulnerability to a lightning strike.

In the case of conventional downward lightning the Inhibitor has the objective of reducing or completely eliminating that part of the attractive radius of any structure that is potentially spanned by the positive leader. In the case of a structure or any object with a limited projected area on the ground, this will accordingly substantially reduce the attractive radius $r_a$ and could reduce the exposure area ($\pi r_a^2$) around the structure by up to a factor of ten.

Exposure of electric power lines and substations to lightning strokes is very similar to the exposure of structures as explained above. One difference however is that due to the limited heights of conductors and structures electric power installations are not prone to upward flashes and can only be struck due to descending leaders. Lightning protection of power line conductors is mostly carried out by overhead ground wires, although lightning rods are sometimes used on substation portals. Insulation flashover of lines and substations due to lightning occur due to two distinct mechanisms. The first being: "shielding failure", where the power conductor is struck despite the presence of the overhead ground wire protection. The second mechanism called: "backflashover", occurs when the tower tip or overhead ground wire is struck, momentarily raising its potential above ground and over stressing the insulator string between the conductor and the tower structure. In both cases positive charges induced on the line conductor or overhead ground wire due to the descending negative leader overstress the surrounding air, creating positive streamers. These streamers, when reaching a critical size, produce a positive ascending leader which plays a major role in the attachment mechanism and therefore in determination of the lateral attractive distance of the conductor or overhead ground wire.

A streamer free Wet/Dry Glow-Based Streamer Inhibitor coil wound around the overhead ground wire would create a positive space charge cloud which in turn would induce negative charges on both the ground wire and the protected electrical conductors. This will inhibit the positive streamers/ leader creation process and significantly reduce their lateral attractive distances.

For stroke currents associated with shielding failure, normally in the range 5-15 kA, modeling of the attachment mechanism (ref. [6]) shows that the positive leader emanating from the conductors roughly covers one half of the lateral attractive distance. A Wet/Dry Glow-Based Streamer Inhibitor coil could therefore reduce the lateral attractive distance by up to a factor of two or more. The stroke currents associated with the backflashover are much larger, often in the 100 kA range. Here the positive leader ascending from the ground wire could cover as much as two thirds of the lateral attractive distance, so that application of the Wet/Dry Glow-Based Streamer Inhibitor will be even more effective in reducing the number of strikes associated with backflashovers.

For the case of upward lightning, suppressing positive streamer formation from the structure would have the effect of raising the required ambient field, caused by the cloud charges, for the formation of the upward leader from the protected structure. The ambient ground field due to cloud charges is a statistical variable which normally varies in the range 2 kV/m-18 kV/m (ref. [1], [2]). The critical ambient field for upward lightning occurrence for a structure is given by the simple expression Eg=1600/h. So for example a 135 m communication tower will have a critical ambient field of 12 kV/m, while for a structure like the CN Tower with a height of 553 m the critical ambient field amounts to 3 kV/m. Therefore by raising the required critical ambient field and depending on the height of the structure and the amount of space charge produced the inhibitor will have the effect of reducing or completely eliminating upward lightning from such structures.

The invention as well as its numerous advantages will be better understood by reading of the following non-restrictive description of preferred embodiments made in reference to the appended drawings.

BRIEF DESCRIPTION OF THE DRAWINGS

FIGS. 2a and 2b are respectively a side section and top views of a plain single toroid electrode used as a support structure, according to a preferred embodiment of the present invention.

FIGS. 3a and 3b are respectively a side section and top views of a segmented toroid electrode used as a support structure, according to a preferred embodiment of the present invention.

FIG. 14b is a side view of the longitudinal details of the overhead ground wire shown in FIG. 14a.

FIG. 16b is a side view of the longitudinal details of the guyed wire shown in FIG. 16a.

DESCRIPTION OF PREFERRED EMBODIMENTS

Figure 1:
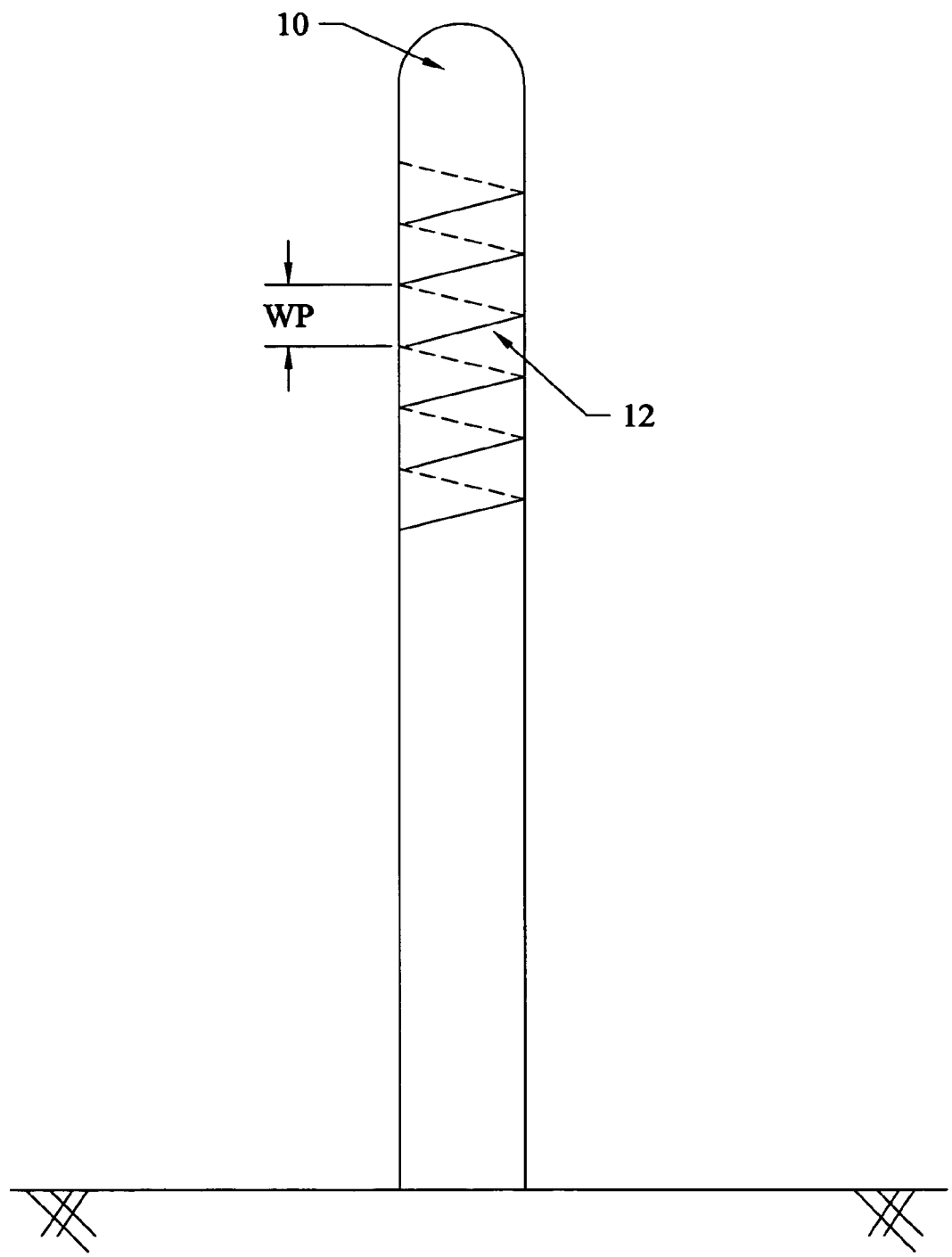
FIG. 1 is a side section view of a conventional lightning rod which is wrapped in a space charge producing element, a very thin (diameter less than 0.1 mm) conducting wire, fiber, filament, bundle of filaments or yarn forming an electric inhibitor coil, according to a preferred embodiment of the present invention.

Referring to FIG. 1, there is shown a lightning rod 10 that is wrapped in a space charge producing conductor 12 forming an electric inhibitor coil. The space charge producing conductor 12 may be a very thin (of diameter not exceeding 0.1 mm) conducting wire, fiber, filament, bundle of filaments, yarn or woven or knitted fabric made from such fibers or wires. The conducting wires or the like may be wound around the lightning rod 10 at a given winding pitch defining a winding pitch distance WP.

Referring to FIGS. 2a, 2b, 3a, 3b, there are shown a plain single toroid electrode 14 and a segmented toroid electrode 16 that may be used as a support structure, according to preferred embodiments of the present invention. The toroid electrodes 14, 16 are shown with their minor diameter d, major diameter D, inner major diameter Di, and outer major diameter Do. These establish the various parameters and dimensions which can be varied for the purposes of the invention.

Figure 4A:
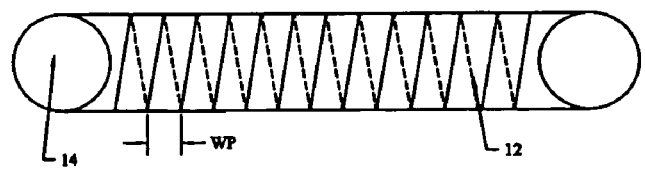
FIG. 4a is a cross sectional view of a single continuous toroid and thin conducting wires or fibers used as space charge producing conductors that are wrapped around a toroid in the transverse sense forming an inhibitor coil, according to a preferred embodiment of the present invention.
Figure 4B:
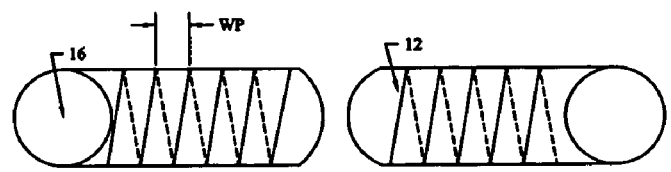
FIG. 4b is a cross sectional view of a segmented toroid and thin conducting wires or fibers used as space charge producing conductors that are wrapped around the toroid in the transverse sense forming an inhibitor coil, according to a preferred embodiment of the present invention.

Referring to FIGS. 4a, 4b, there are shown respectively a continuous single metallic toroid 14 and a segmented toroid 16 that are each wrapped with thin conducting wires or fibers used as space charge producing conductors 12 in the transverse sense forming an inhibitor coil, according to a preferred embodiment of the present invention.

Figure 4C:
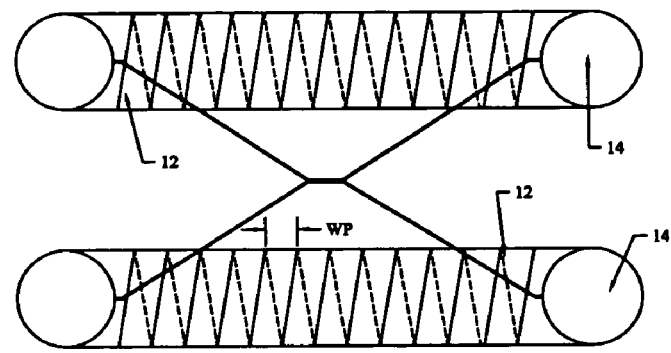
FIG. 4c is a cross sectional view of a double toroid and thin conducting wires or fibers used as space charge producing conductors that are wrapped around in the transverse sense forming two inhibitor coils, according to a preferred embodiment of the present invention.

Referring to FIG. 4c there is shown two continuous toroids 14 and thin conducting wires or fibers used as space charge producing conductors 12 that are wrapped around in the transverse sense forming two inhibitor coils, according to a preferred embodiment of the present invention.

Figure 4D:
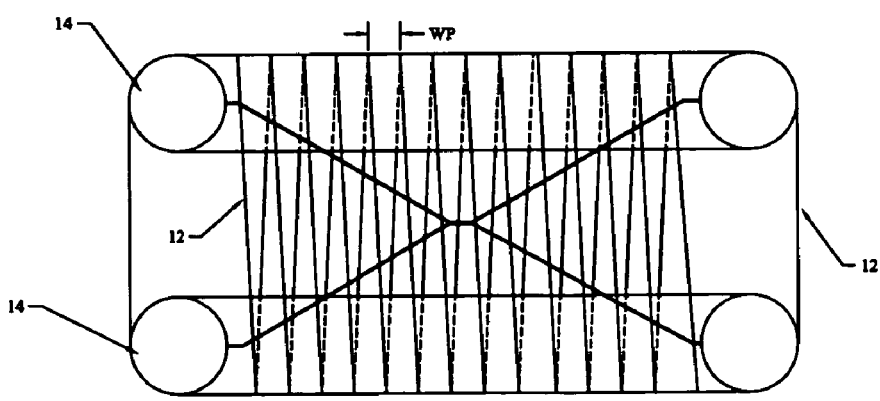
FIG. 4d is a cross sectional view of a double toroid and thin conducting wires or fibers used as space charge producing conductors that are wrapped around in the transverse sense forming a single inhibitor coil, according to a preferred embodiment of the present invention.

Referring to FIG. 4d there is shown two continuous toroids 14 and thin conducting wires or fibers used as space charge producing conductors 12 that are wrapped around in the transverse sense forming a single inhibitor coil, according to a preferred embodiment of the present invention.

Figure 5A:
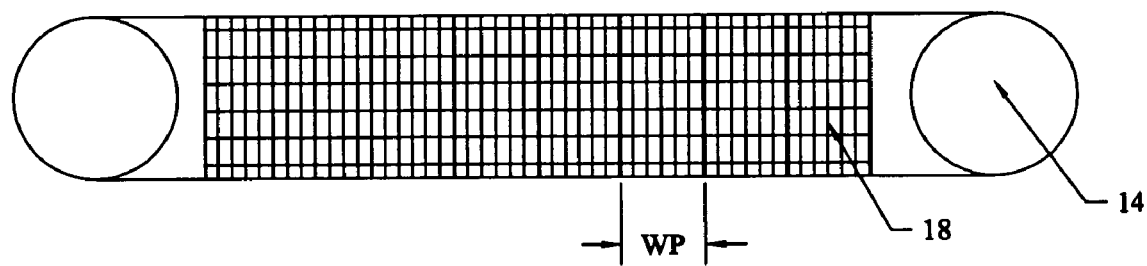
FIG. 5a is a cross sectional view of a continuous toroid and woven or knitted fabric made of thin conducting fibers or wires used as space charge producing conductors that are wrapped around the toroid in both the longitudinal and transverse sense forming an inhibitor coil, according to a preferred embodiment of the present invention.

Referring to FIG. 5a, there is shown a continuous toroid 14 and woven or knitted fabric 18 made of thin conducting fibers or wires used as space charge producing conductors 12 that are wrapped around the toroid 14 in both the longitudinal and transverse sense forming a multi-layered inhibitor coil, according to a preferred embodiment of the present invention.

Figure 5B:
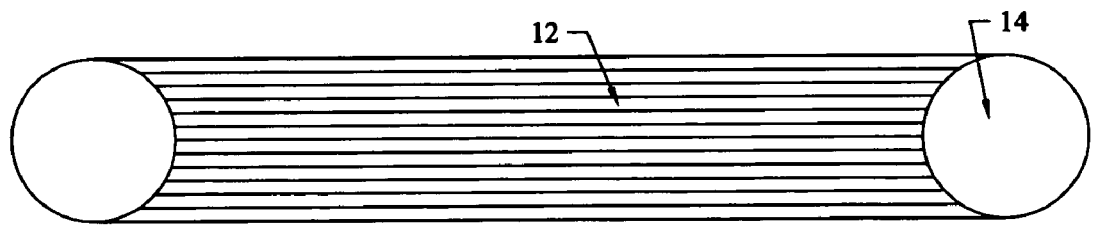
FIG. 5b is a cross sectional view of a continuous toroid and thin conducting fibers or wire used as charge producing conductors that are wrapped around the toroid in the longitudinal sense forming an inhibitor coil, according to a preferred embodiment of the present invention.

Referring to FIG. 5b, there is shown a continuous toroid and thin conducting fibers or wire used as space charge producing conductors 12 that are wrapped around the toroid in the longitudinal sense forming an inhibitor coil, according to a preferred embodiment of the present invention.

Figure 6:
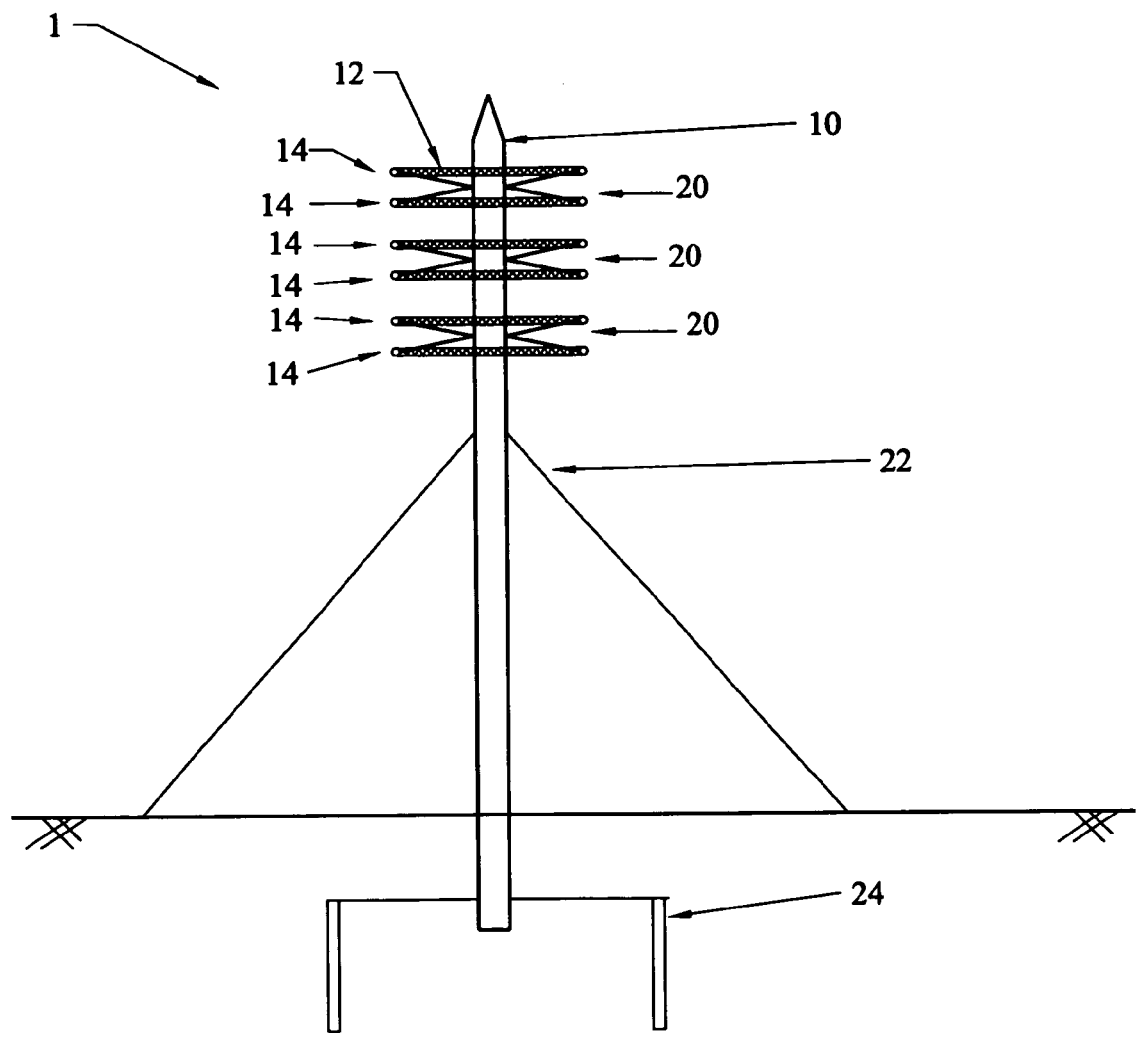
FIG. 6 is a side sectional view of multiple double toroid Wet/Dry Glow-Based Streamer Inhibitors mounted on a free-standing lightning protection pole, according to a preferred embodiment of the present invention.

Referring to FIG. 6, there is shown a free-standing lightning protection pole 10 with multiple double toroid inhibitors coils 20 similar to the one shown in FIG. 4a mounted thereon forming a lighting protection device 1, according to a preferred embodiment of the present invention. Since the toroids 14 wrapped in thin conductors 12 are mounted onto an UL approved lightning rod, the toroidal electrode or toroidal Wet/Dry Glow-Based Streamer Inhibitor coil may be used in any location where conventional lightning rods are used, thereby easily forming the lightning protection device 1. The pole 10 is shown supported by guyed wires 22 and connected to grounded electrodes 24.

Figure 7:
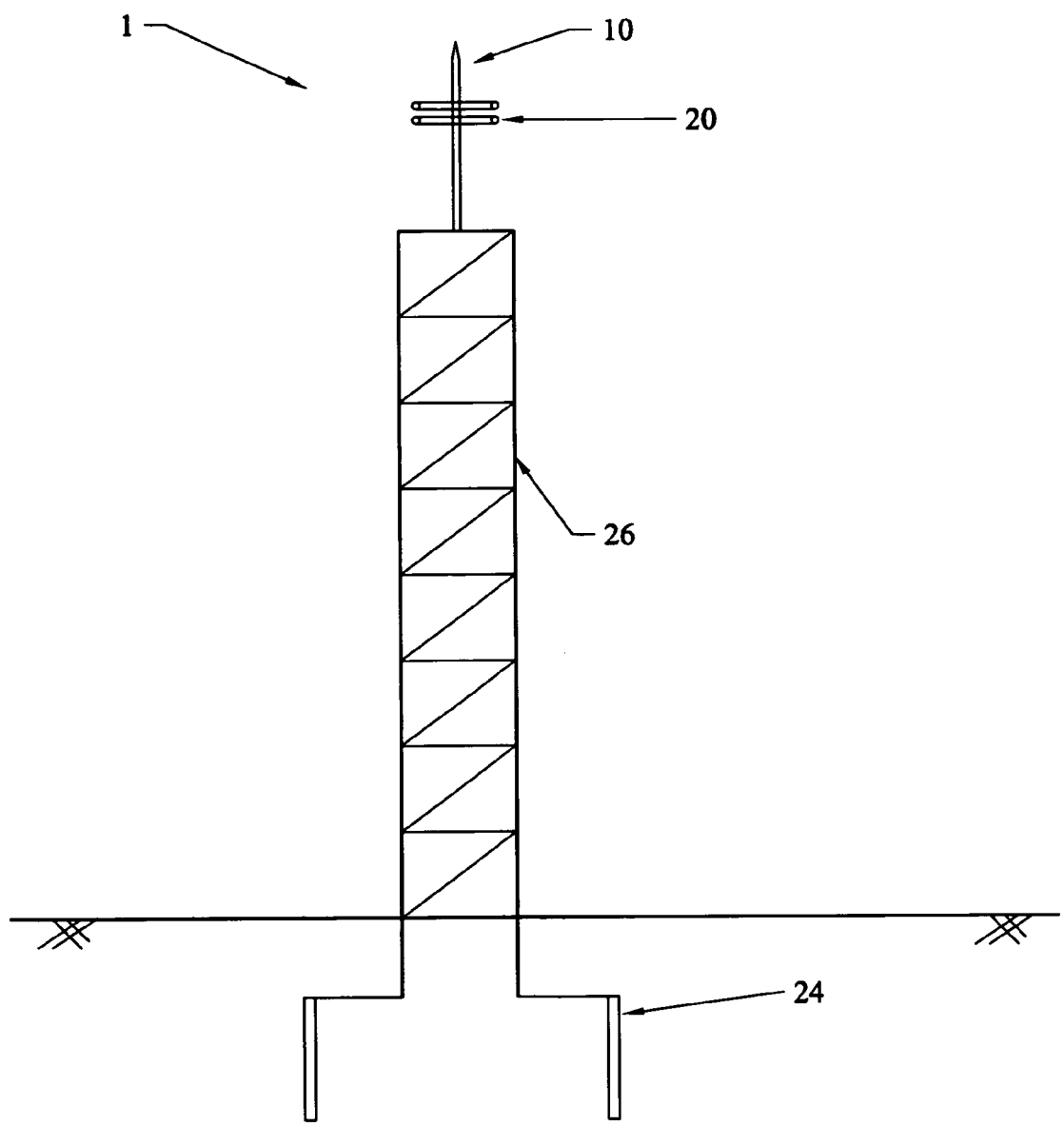
FIG. 7 is a side sectional view of a tower with top mounted double toroid Wet/Dry Glow-Based Streamer Inhibitor fixed to a conventional lightning protection rod and grounding system, according to a preferred embodiment of the present invention.

Referring to FIG. 7, there is shown a lightning protection device 1 according to a preferred embodiment of the present invention, which is mounted on the top of a tower 26. The lighting protection device 1 is made of a double toroid Wet/Dry Glow-Based Streamer Inhibitor coil 20 fixed to a conventional lightning protection rod 10 and connected to a grounding system or ground electrodes 24.

Figure 8:
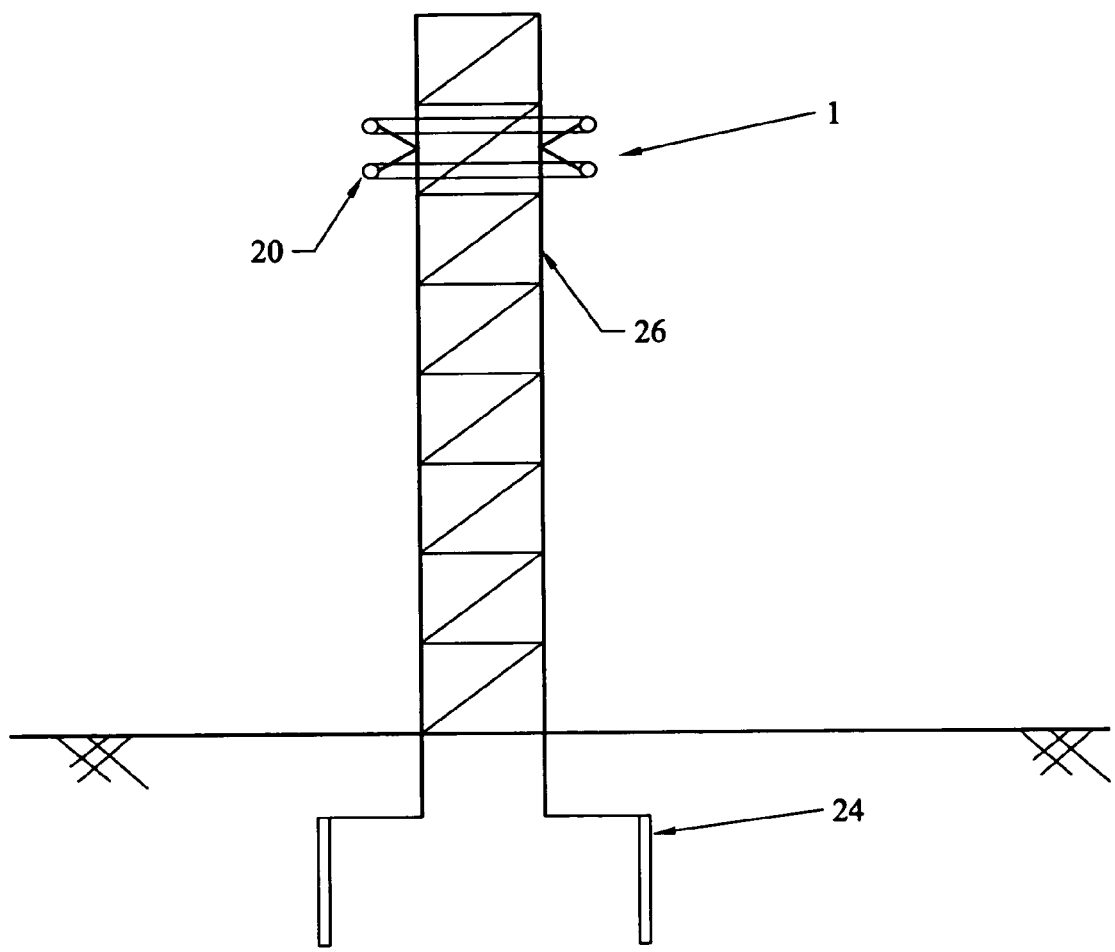
FIG. 8 is a side sectional view of a double toroid Wet/Dry Glow-Based Streamer Inhibitor directly mounted onto a tower and grounded with a conventional grounding system, according to a preferred embodiment of the present invention.

Referring to FIG. 8, there is shown a lightning protection device 1 according to another preferred embodiment of the present invention, which is mounted around a tower 26. The lighting protection device 1 is made of a double toroid Wet/Dry Glow-Based Streamer Inhibitor coil 20 connected to ground electrodes 24.

Figure 9:
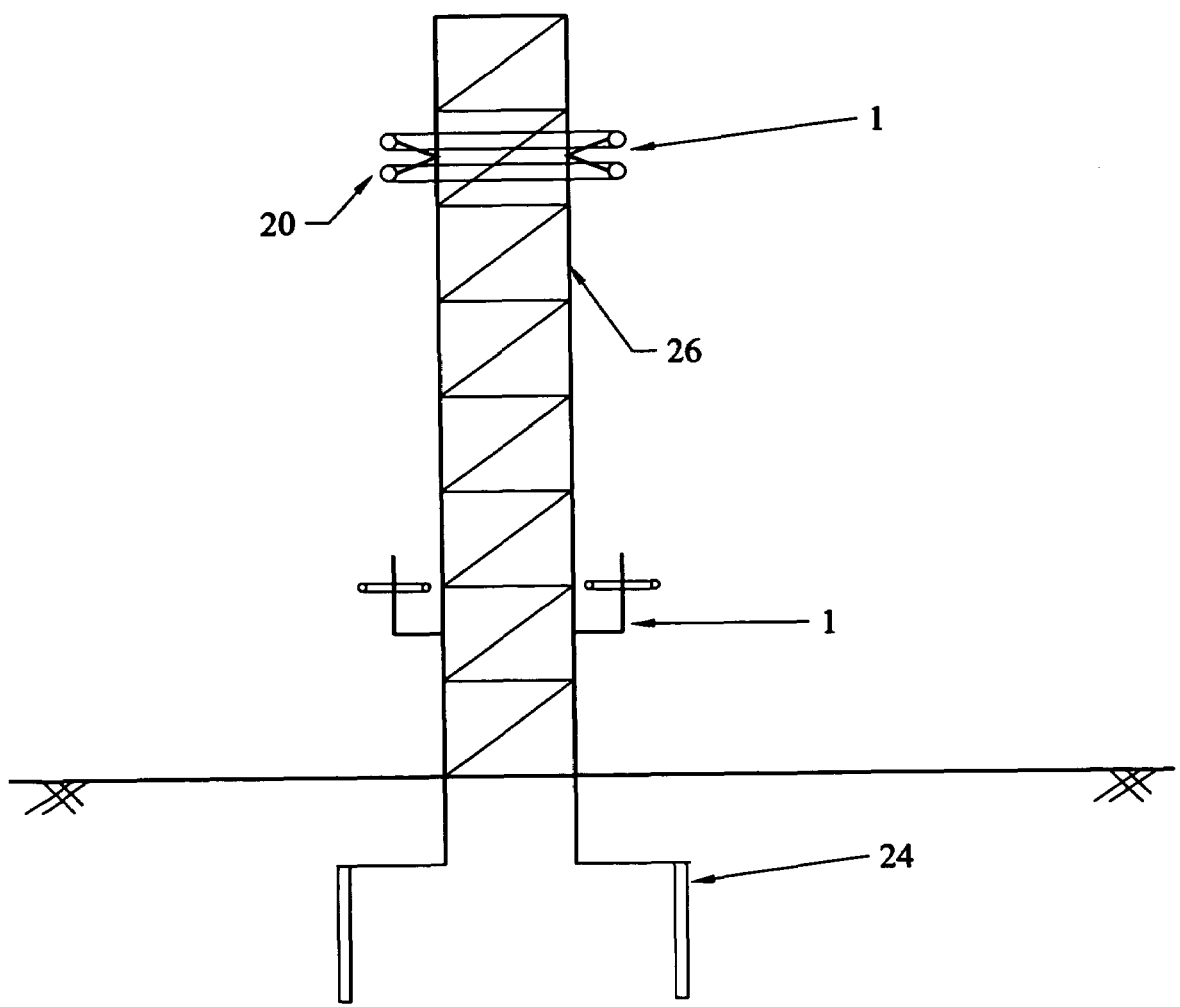
FIG. 9 is a side sectional view of multiple toroidal Wet/Dry Glow-Based Streamer Inhibitors mounted onto a tower, according to a preferred embodiment of the present invention.

Referring to FIG. 9, where as the invention is put forth as a single unit, several units can be used in tandem to render an object such as a tall communication tower 26 electrically silent. In this example, there is shown a directly mounted lightning protection device or Inhibitor 1 near the top and some lightning protection devices or pole mounted Inhibitors 1 nearer to the bottom of the tower 26 and connected to a grounding system 24.

Figure 10:
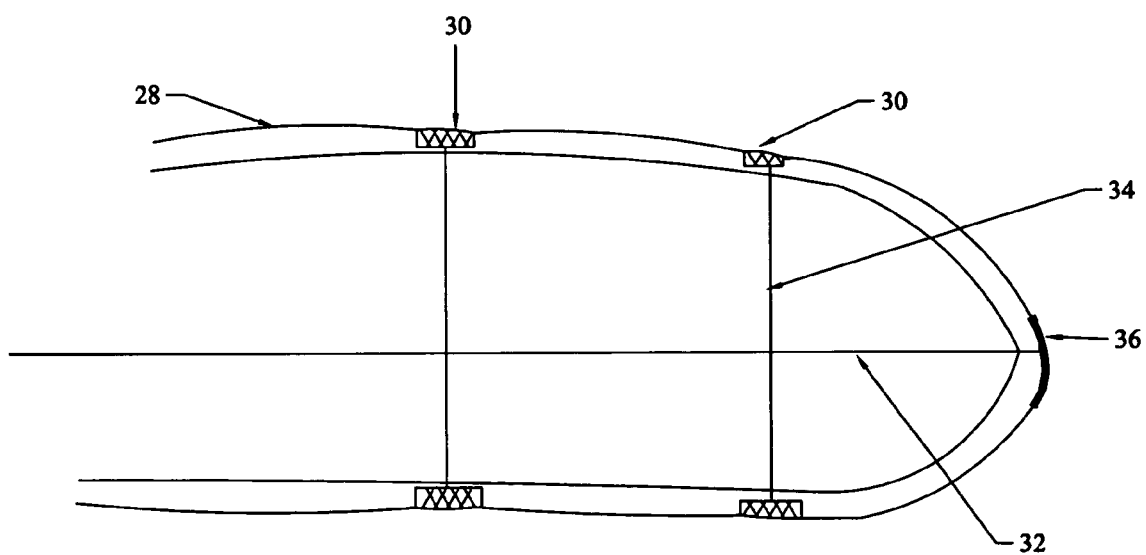
FIG. 10 is a cross sectional view of an insulating wind turbine blade and the embedded Wet/Dry Glow-Based Streamer Inhibitor coils with ground wires, according to a preferred embodiment of the present invention.

Referring to FIG. 10, there is shown a lighting protection device used to protect a wind turbine blade 28, according to another preferred embodiment of the present invention. In this example, an inhibitor coil 30 may be made such as to be embedded into the insulating blade of the wind turbine blade 28, which acts as the support structure in this case. The embedded coils 30 are connected to ground via wires 32, which may be in turn connected to the conventional ground wire 34 of a conventional lightning protection metal tip 36.

Figure 11:
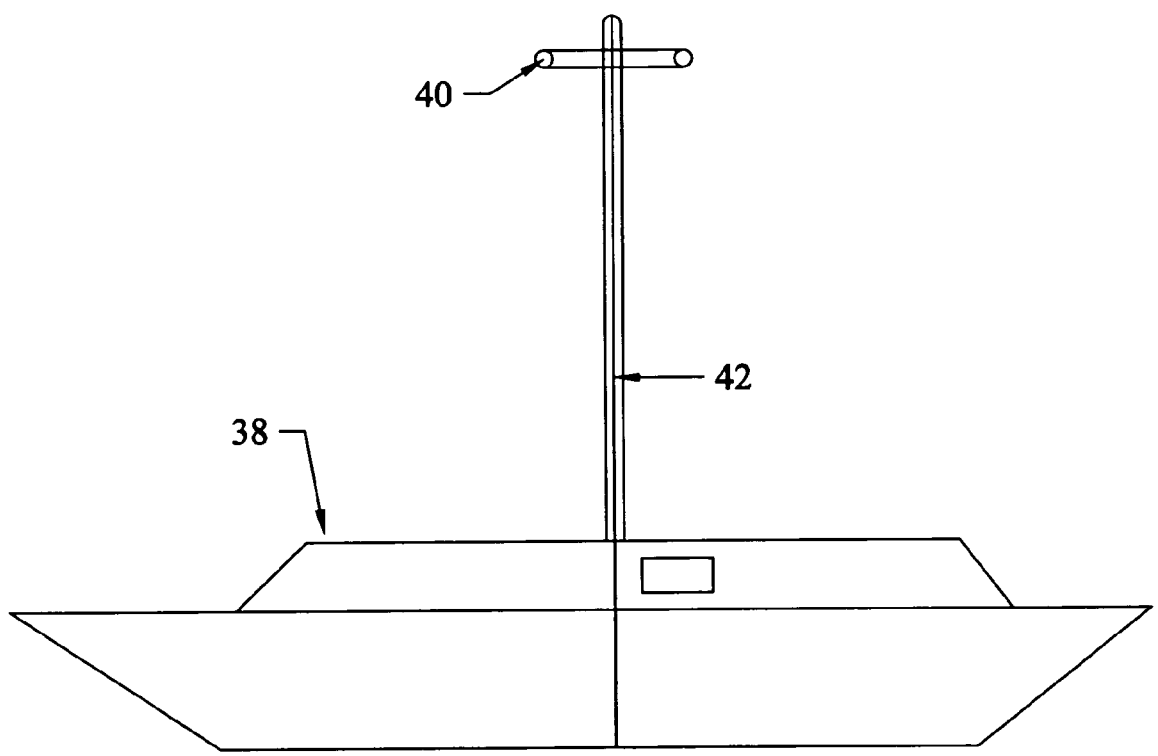
FIG. 11 is a side section view of a top mounted toroidal Wet/Dry Glow-Based Streamer Inhibitor placed onto a boat with ground wire, according to a preferred embodiment of the present invention.

Referring to FIG. 11 there is shown a lighting protection device used to protect a water going vessels or boat 38, according to another preferred embodiment of the present invention. In this example, an inhibitor coil 40 is mounted onto the mast of the boat 38 and is connected to a ground wire 42.

Figure 12:
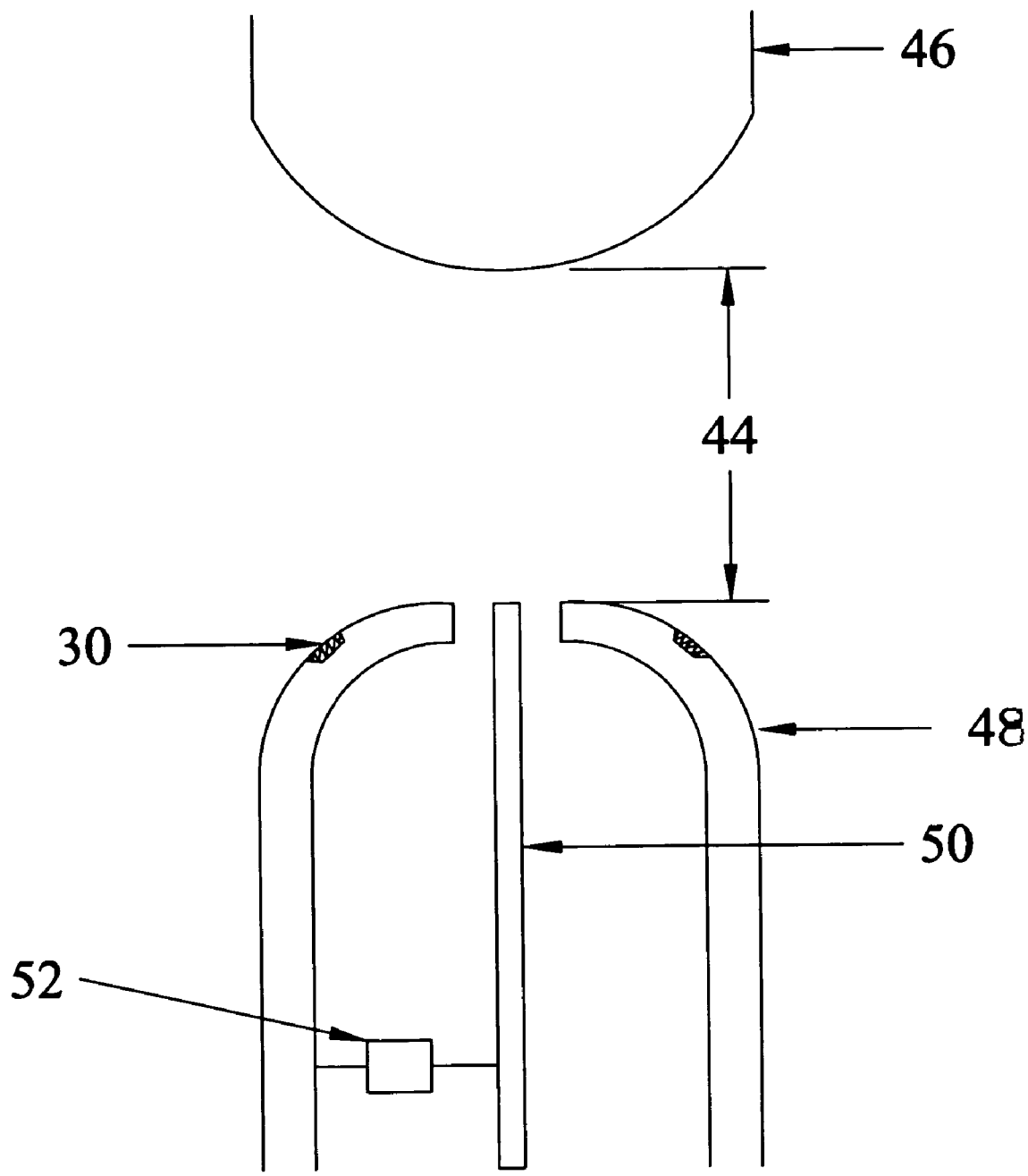
FIG. 12 is a schematic diagram of a high voltage DC triggered airgap (trigaron) with embedded inhibitor coils, according to a preferred embodiment of the present invention.

Referring to FIG. 12, there is shown an example of a high voltage DC triggered airgap (trigaron) with embedded inhibitor coils 30, according to a preferred embodiment of the present invention. The adjustable airgap 44 is defined between a negative high voltage electrode 46 and positive ground voltage electrode 48, which is connected to trigger electrode via an insulating resistor 50. By inhibiting positive streamers the device according to the present invention can be used to increase the minimum breakdown voltage of an air gap, such as in the case of a Trigatron, and reduce the dispersion of the breakdown voltage to prevent erratic sparkover of the gap before the triggering impulse is applied. An alternative arrangement of the Trigatron would be to connect the inhibitor carrying electrode 30 to a positive potential source while grounding the counter electrode.

Figure 13:
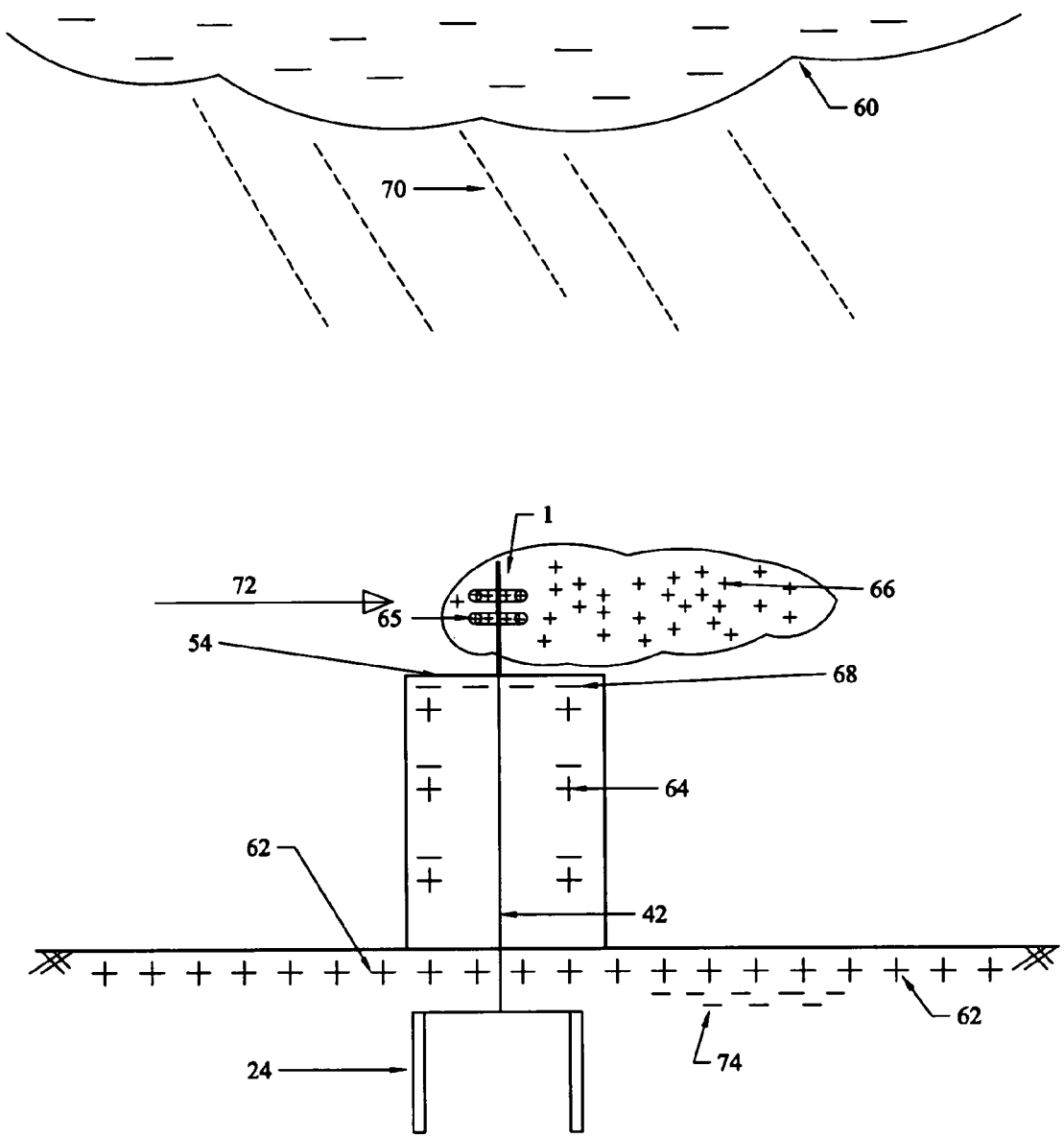
FIG. 13 is a schematic diagram of lighting protection device embodied as a toroidal Wet/Dry Glow-Based Streamer Inhibitor mounted onto a structure to be protected, according to a preferred embodiment of the present invention.

Referring to FIG. 13, there is shown a lighting protection device embodied as a toroidal Wet/Dry Glow-Based Streamer Inhibitor 1 mounted onto a structure 54 to be protected, according to a preferred embodiment of the present invention. The inhibitor 1 is connected to ground electrodes 24 via a ground wire 42. The negative cloud charges 60 induce positive charges 62 on the ground, positive charges 64 on the structure 54 and positive charges 65 on the Wet/Dry Glow-Based Streamer Inhibitor 1. The positive charges 65 induced on the Inhibitor 1 lead to ionization of air around the Inhibitor and the generation of enough positive space charge 66, streamer free, to induce a negative charge 68 on the structure 54 to be protected, even in rain 70 and windy conditions 72, counteracting the induced charge by the cloud and thereby inhibiting the formation of positive streamers. A negative charge 74 is also produced in the ground due the inhibitor positive charge 66.

Figure 14A:
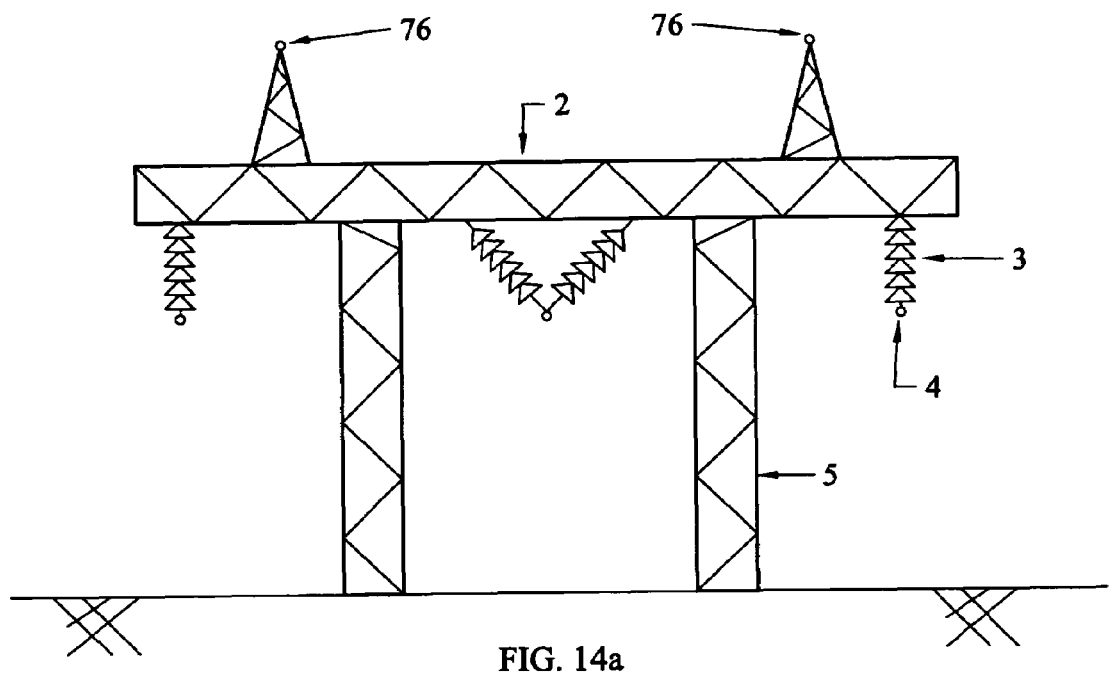
FIG. 14a is a side section view of the overhead ground wires fitted with Wet/Dry Glow-Based Streamer Inhibitor coils, which are suspended between the towers of an electrical transmission line or the support structures of a substation, according to a preferred embodiment of the present invention.
Figure 14B:
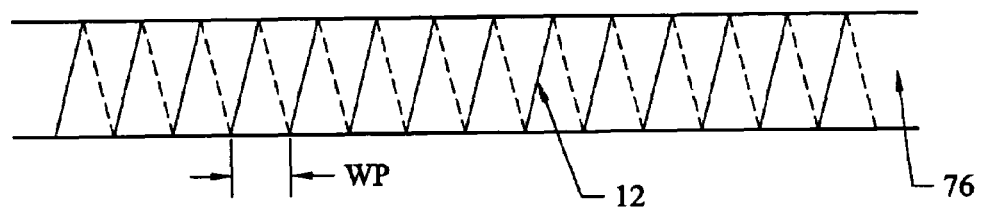

Referring to FIGS. 14a and 14b, a space charge producing conductor 12 is wound around overhead ground wires 76 which are suspended between the towers of an electrical transmission line or the support structures of a substation or where ever overhead ground wires are used, forming an electric coil.

Figure 15:
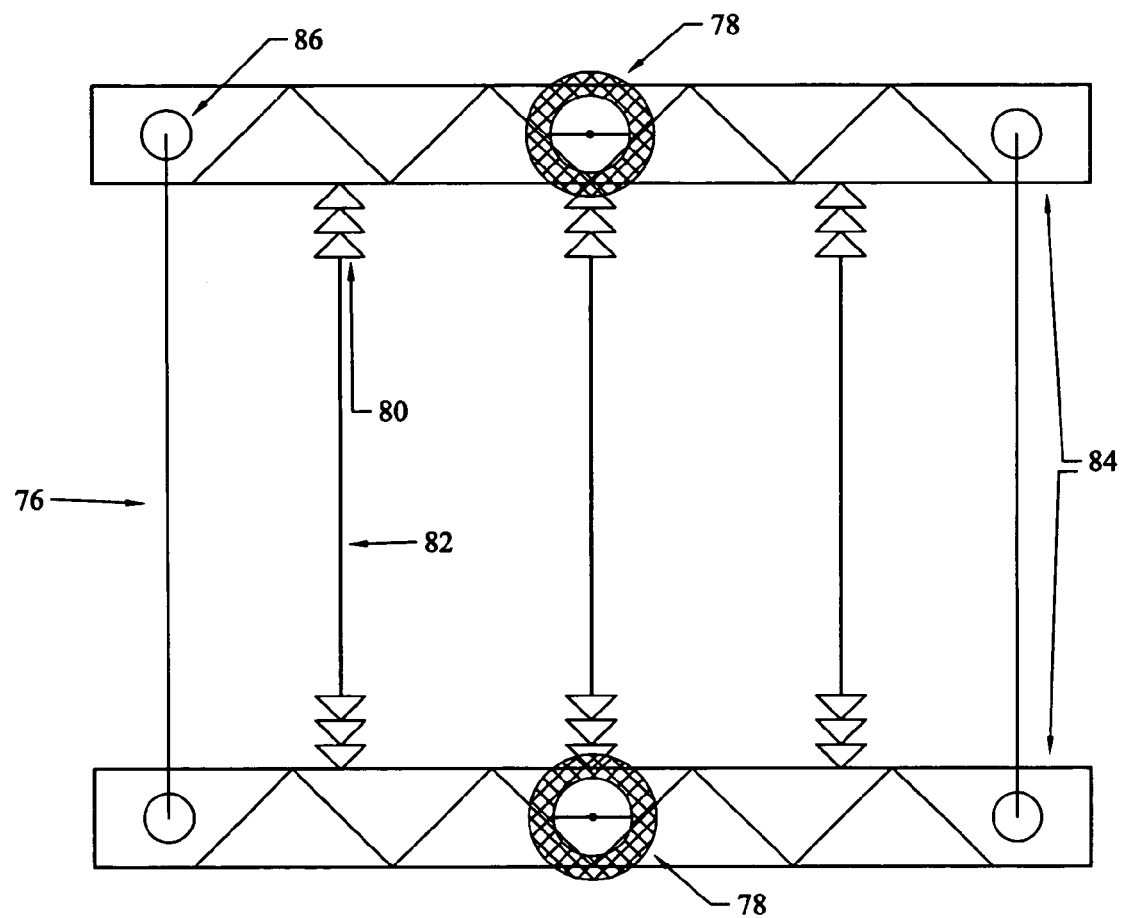
FIG. 15 is a plan view of two substation portals with two overhead ground wires fitted with Wet/Dry Glow-Based Streamer Inhibitor coils as well as two pole-mounted toroidal Wet/Dry Glow-Based Streamer Inhibitors, according to a preferred embodiment of the present invention.

Referring to FIG. 15, there is shown two substation portals with two overhead ground wires 76 fitted with Wet/Dry Glow-Based Steamer Inhibitor coils as well as two pole-mounted toroidal Wet/Dry Glow-Based Streamer Inhibitors 78. The substation portals include insulating strings 80, bus bar 82, steel portals, and ground wire support 86.

Figure 16A:
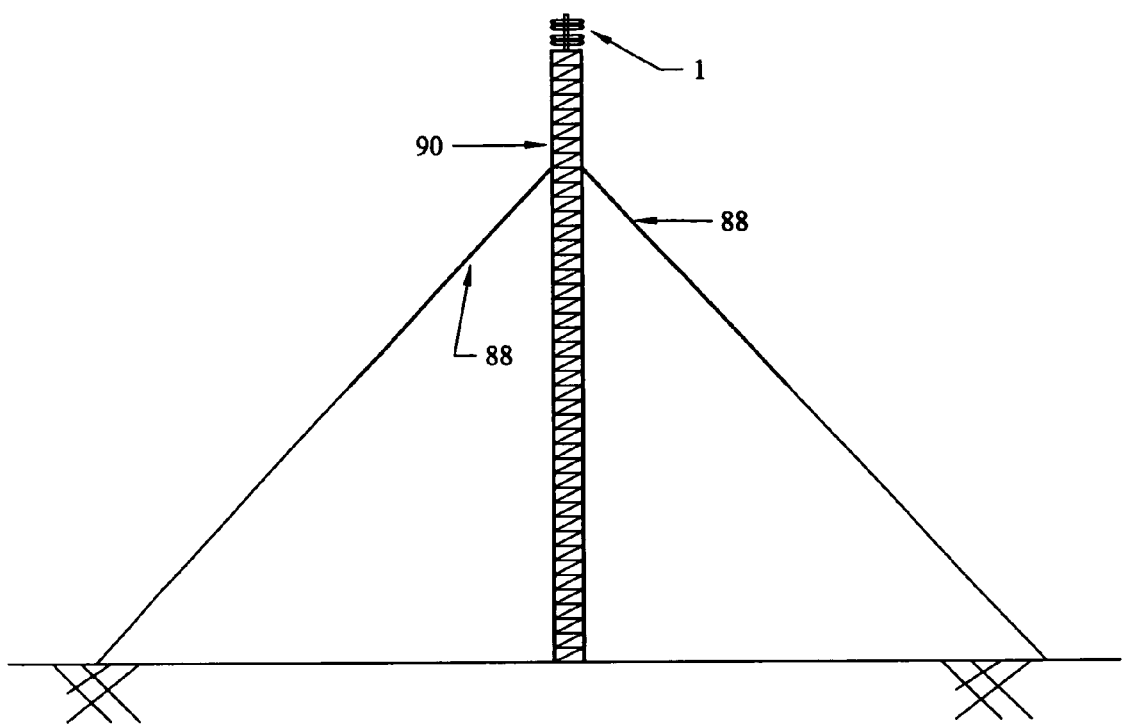
FIG. 16a is a sectional elevation of a communication tower with guyed wires that are fitted with Wet/Dry Glow-Based Streamer Inhibitor coils, according to a preferred embodiment of the present invention.
Figure 16B:
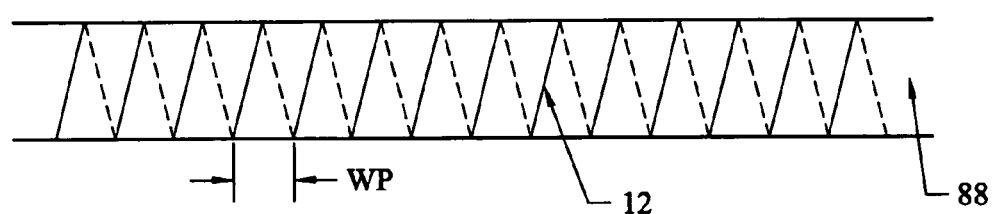

Referring to FIGS. 16a and 16b, a space charge producing conductor 12 is wound around the guyed wires 88, which are used to support a structure 90, forming an electric coil. The charge producing conductor only needs to be wound on a portion only of the guyed wires 88. A top mounted toroidal inhibitor 1 may be optionally be provided.

Figure 17:
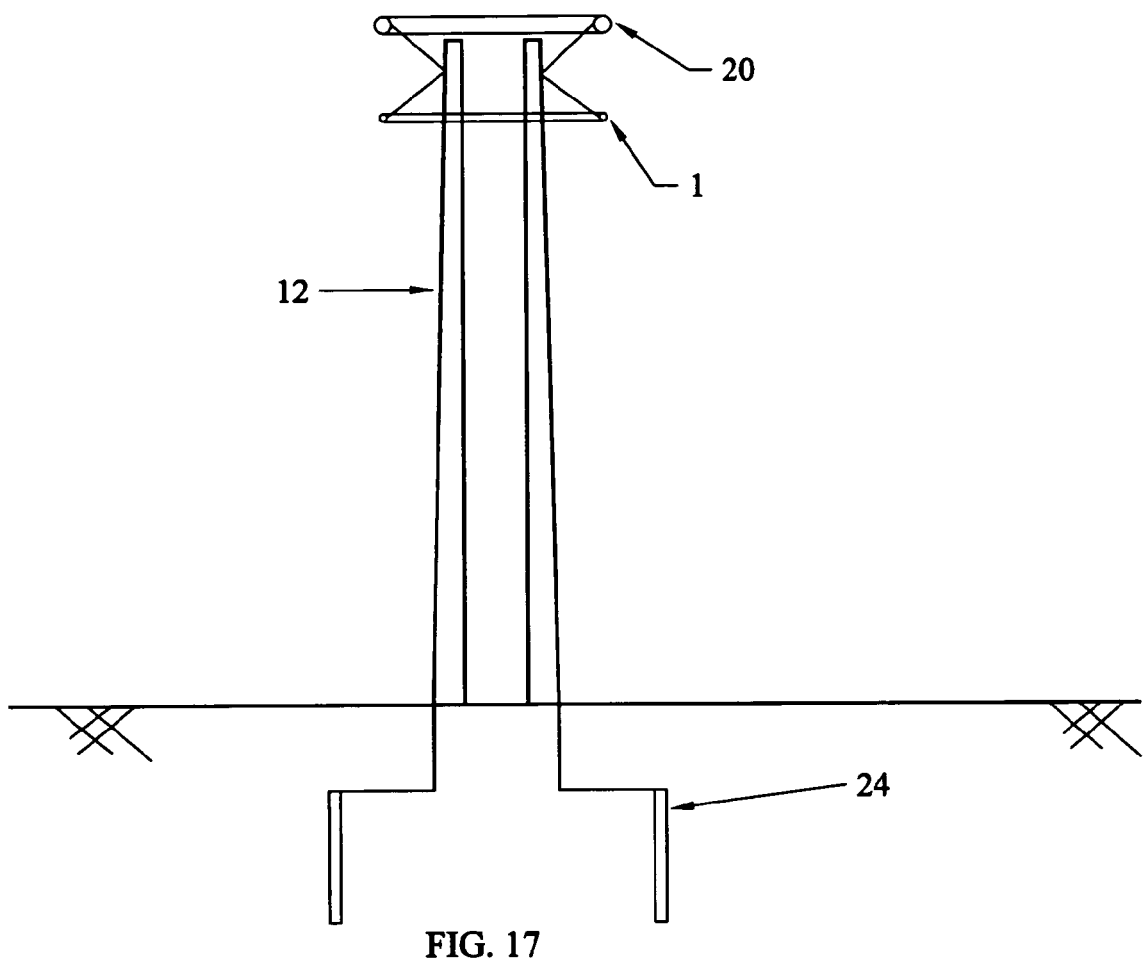
FIG. 17 is a side view of a toroidal Wet/Dry Glow-Based Streamer Inhibitor mounted onto a metal smoke stack, according to a preferred embodiment of the present invention.

Referring to FIG. 17, a toroidal Wet/Dry Glow-Based Streamer Inhibitor 1 can be mounted onto a metal smoke stack 92. The inhibitor is connected to ground electrodes 24.

Experimental Tests

Between Jan. 23 and 31 of 2006 the authors of the present patent commissioned and witnessed two series of experiments at Hydro Quebec's High Voltage Laboratory. The objective of the tests was to determine the effect that thin wires would have on:

The corona inception voltage of an electrode;

The production of impulsive currents (streamers) versus DC currents (glow-mode corona);

The breakdown voltage of a 1.5 meter double toroid-plane air gap where the test electrodes served as the anode.

A number of identical stainless steel test electrodes were constructed, each electrode consists of two toroids whose major diameters are one meter and whose minor diameters are 2.54 cm (one inch) and the toroids are mounted 30 cm (12 inches) apart, symmetrically on a stainless steel frame. One double toroid test electrode was left bare and served as the "control" while the other test electrodes were wound with varying quantities of:

A 50 micron (diameter) stainless steel wire;

A bundle of 275 filaments of 12 micron (diameter) stainless steel fibre;

A woven fabric made of a bundle of filaments of 12 micron (diameter) stainless steel fiber.

In the first series of experiments the test electrodes were mounted 3.5 m above ground on a vertical aluminum pole of diameter 10 cm (4 inches). A conducting plate of approximately 6 m diameter was suspended above the test electrodes at a height of 5 meters above ground or 1.5 meters above the test electrode. Each electrode was tested separately under direct voltage (DC) in both wet and dry conditions. The voltage of the conducting plate was raised to negative 600 kV in approximately 45 seconds and we took note of the corona inception voltage (through measurements of current flow as well as the monitoring of visible discharges and audible noise), the voltage was held at 600 kV for one minute and then raised until breakdown. It was noted that for the DRY bare "control" electrode the corona inception voltage was approximately 400 kV and the breakdown voltage of the 1.5 meter gap was approximately 650 kV. Furthermore it was producing significant streamer activity from 400 kV up until breakdown. When the same electrode was wet the corona inception voltage was approximately 250 kV with little change in the breakdown voltage and significant streamer activity.

However, when the correct quantities of thin wires or thin fibers or a woven fabric made of such fibers was wound around the test electrodes and they were exposed to the same conditions, there were significant differences observed. The corona inception voltage both wet and dry was reduced to as low as 150 kV. The breakdown voltage of the gap was increased by approximately 150 kV and the electrode produced a DC current as high as 1.7 mA or it produced space charge at a rate of approximately 1.7 mC/s. Furthermore, the electrodes produced no streamers at all right up until breakdown in both wet and dry conditions.

In the second series of tests, the test electrodes were connected directly to a positive DC source and suspended upside down 3.5 meters above a large steel plate grounded through a current measuring shunt. The voltage was raised in steps up to 800 kV and measurements and observations were made during each plateau. It was observed that the bare test electrode had significant steamer activity both wet and dry but that once again the presence of the right configuration of thin wires or thin fibers eliminated any streamer activity and produced significant amounts of space charge. The second test series was not designed to reach breakdown of the gap.

REFERENCES

1. Modeling of Lightning Incidence to Tall Structures Part I: Theory, Farouk A. M. Rizk, IEEE Trans. on Power Delivery, Vol. 9, No. 1 January 1994, pp. 162-171
2. Modeling of Lightning Incidence to Tall Structures Part II: Application, Farouk A. M. Rizk, IEEE Trans. on Power Delivery, Vol. 9, No. 1 January 1994, pp. 172-193
3. A Model for Switching Impulse Leader Inception and Breakdown of Long Air-Gaps, Farouk A. M. Rizk, IEEE Trans. on Power Delivery, Vol. 4, No. 1, January 1989, pp. 596-606
4. Switching Impulse Strength of Air Insulation: Leader Inception Criterion, Farouk A. M Rizk, IEEE Trans. On power Delivery, Vol. 4. No. 4, October 1989, pp. 2187-2195
5. Influence of Rain on Switching Impulse Sparkover Voltage of Large Electrode Air-Gaps, Farouk A. M. Rizk, IEEE Trans. on Power Apparatus and Systems, Vol. PAS-95, No. 4, July/August 1976, pp. 1394-1402
6. Modeling of Transmission Line Exposure to Direct Lightning Strokes, Farouk A. M. Rizk, IEEE Trans. on Power Delivery, Vol. 5, October 1990, pp 1983-1997

The invention claimed is:

1. A lightning protection device for reducing exposure of an object to be protected from conventional and upward lightning strikes, the device comprising:

a support structure adapted to be grounded; and space charge producing conductors wound around the support structure and forming coils for producing space charge of opposite polarity to a cloud charge, in a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions.

2. The lightning protection device according to claim 1, wherein the space charge producing conductors are selected from the group including a conducting wire, a bundle of conducting wires, a conducting fiber, a conducting filament, a bundle of conducting filaments, a yarn made of conducting wires, a yarn made of a bundle of conducting wires, a yarn made of conducting fibers, a yarn made of conducting filaments, a yarn made of a bundle of conducting filaments, a knitted fabric made of conducting wires, a knitted fabric made of a bundle of conducting wires, a knitted fabric made of conducting fibers, a knitted fabric made of conducting filaments, a knitted fabric made of a bundle of conducting filaments, a woven fabric made of conducting wires, a woven fabric made of a bundle of conducting wires, a woven fabric made of conducting fibers, a woven fabric made of conducting filaments, a woven fabric made of a bundle of conducting filaments, and wherein each of said wires, fibers and filaments has a diameter not exceeding 0.1 mm.

3. The lightning protection device according to claim 2, wherein the support structure is grounded and is selected from the group including: a continuous toroid, a sectionalized toroid, a continuous metallic toroid, a sectionalized metallic toroid, a lightning pole, an overhead ground wire of transmission lines, an overhead ground wire of an electrical substation, guyed wires and a wind turbine blade.

4. The lightning protection device according to claim 3, wherein the space charge producing conductors are wound around the support structure to form a single layer of conductors.

5. The lightning protection device according to claim 3, wherein the space charge producing conductors are wound around the support structure to form multiple layers of conductors.

6. The lightning protection device according to claim 3, wherein the space charge producing conductors are wound around the support structure in a longitudinal direction.

7. The lightning protection device according to claim 3, wherein the space charge producing conductors are further wound around the support structure in a transverse direction.

8. The lightning protection device according to claim 3, wherein the space charge producing conductors are wound around the support structure in both a longitudinal direction and a transverse direction.

9. A method of making a lightning protection device for reducing exposure of an object to be protected from conventional and upward lightning strikes, the method comprising steps of:
   a) providing a support structure adapted to be grounded; and
   b) winding space charge producing conductors around the support structure to form coils for producing space charge of opposite polarity to a cloud charge, In a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions.

10. The method according to claim 9, wherein the space charge producing conductors are selected from the group including a conducting wire, a bundle of conducting wires, a conducting fiber, a conducting filament, a bundle of conducting filaments, a yarn made of conducting wires, a yarn made of a bundle of conducting wires, a yarn made of conducting fibers, a yarn made of conducting filaments, a yarn made of a bundle of conducting filaments, a knitted fabric made of conducting wires, a knitted fabric made of a bundle of conducting wires, a knitted fabric made of conducting fibers, a knitted fabric made of conducting filaments, a knitted fabric made of a bundle of conducting filaments, a woven fabric made of conducting wires, a woven fabric made of a bundle of conducting wires, a woven fabric made of conducting fibers, a woven fabric made of conducting filaments, a woven fabric made of a bundle of conducting filaments, and wherein each of said wires, fibers and filaments has a diameter not exceeding 0.1 mm.

11. The method according to claim 10, wherein the support structure Is grounded and is selected from the group including: a continuous toroid, a sectionalized toroid, a continuous metallic toroid, a sectionalized metallic toroid, a lightning pole, an overhead ground wire of transmission lines, an overhead ground wire of an electrical substation, guyed wires and a blade of a wind turbine.

12. The method according to claim 11, wherein step b) comprises steps of selecting a given winding pitch of the coils formed by the space charge producing conductors and selecting a given length of the space charge producing conductors wound around the support structure to control a rate of the space charge that is produced in the proximity of the object to be protected.

13. The method according to claim 11, wherein step a) comprises a step of selecting a given height above ground of the support structure to control a value of an electric field to which the space charge producing conductors are exposed for any given ambient field.

14. The method according to claim 11, wherein step a) comprises steps of selecting a given length of the support structure and selecting a given length of the space charge producing conductors to control a value of the rate of the space charge that is produced in the proximity of the object to be protected for any given ambient field and a given height above ground of the support structure.

15. The method according to claim 11, wherein step a) comprises steps of selecting a given diameter of the support structure and selecting a length of the space charge producing conductors to control a value of the rate of the space charge that is produced in the proximity of the object to be protected for any given ambient field and a given height above ground of the support structure.

16. The method according to claim 10, wherein the support structure is a conducting support structure and step a) comprises a step of selecting a diameter of the conducting support structure to control an electric field to which the space charge producing conductors are exposed for any given ambient field and a given height above ground of the support structure.

17. The method according to claim 10, wherein step a) comprises a step of positioning the support structure on top of the object to be protected.

18. The method according to claim 10, wherein step a) comprises a step of positioning the support structure in close proximity to the object to be protected.

19. The method according to claim 10, wherein step b) comprises a step of embedding the coils into the object to be protected.

20. Two or more lightning protection devices for reducing exposure of an object to be protected from conventional and upward lightning strikes, each device comprising:
   a support structure adapted to be grounded; and
   space charge producing conductors wound around the support structure and forming coils for producing space charge of opposite polarity to a cloud charge, in a proximity of the object to be protected, the space charge inducing a charge on the object to be protected of an opposite polarity to a charge induced on the object to be protected by the cloud charge and inhibiting a formation of streamers from the object to be protected, each space charge producing conductor having a diameter not exceeding 0.1 mm for reducing a corona inception voltage of the support structure upon which each space charge producing conductor is wound, in both dry and wet conditions, wherein each lighting protection device is spaced from one another by a given distance.

* * * * *